United States Patent [19]

Hall et al.

[11] Patent Number: 5,006,319

[45] Date of Patent: Apr. 9, 1991

[54] PROCESS FOR REMOVING IRON, CHROMIUM AND VANADIUM FROM PHOSPHORIC ACID

[75] Inventors: Richard E. Hall; Denise D. Goyden, both of Trenton, N.J.

[73] Assignee: FMC Corporation, Philadelphia, Pa.

[21] Appl. No.: 164,289

[22] Filed: Mar. 4, 1988

[51] Int. Cl.$^5$ .................. B01D 11/00; C01B 25/16
[52] U.S. Cl. .................................. 423/54; 423/63; 423/139; 423/321 S
[58] Field of Search ....... 423/321 R, 321 S, DIG. 14; 210/688

[56] References Cited

U.S. PATENT DOCUMENTS

| | | | |
|---|---|---|---|
| 3,067,007 | 12/1962 | Hatch et al. | 423/317 |
| 3,297,401 | 1/1967 | Sakomura et al. | 423/321 R |
| 3,367,749 | 2/1968 | Koerner et al. | 423/321 S |
| 3,449,074 | 6/1969 | Schertzer | 423/321 S |
| 3,458,282 | 7/1969 | Koerner et al. | 423/321 S |
| 3,764,655 | 10/1973 | Ehlers et al. | 423/321 S |
| 3,911,087 | 10/1975 | Villarejos et al. | 423/321 S |
| 3,912,803 | 10/1975 | Williams et al. | 423/321 S |
| 4,154,805 | 5/1979 | Hiraga et al. | 423/321 S |
| 4,235,713 | 11/1980 | Nogueira et al. | 210/638 |
| 4,551,320 | 11/1985 | Dominiani et al. | 423/321 R |
| 4,585,636 | 4/1986 | Iosef et al. | 423/321 R |

FOREIGN PATENT DOCUMENTS 55-116608 9/1980 Japan .
1137074 12/1968 United Kingdom .

OTHER PUBLICATIONS

Chemical Abstracts, 49, 119, abstract 89:165603z, "Removal of Zinc from Phosphoric Acid."
Chemical Astracts, 49, 119, abstract 89:165604a, "Removal of Zinc from Phosphoric Acid."

Primary Examiner—Theodore Morris
Attorney, Agent, or Firm—R. E. Elden; F. Ianno

[57] ABSTRACT

A process is provided for purifying phosphoric acid, such as wet process phosphoric acid by extracting the impure phosphoric acid with a nonaqueous solvent and contacting the nonaqueous solution of phosphoric acid with a strongly basic anion exchange resin and recovering the purified phosphoric acid by stripping the nonaqueous solution with an aqueous solution.

12 Claims, No Drawings

PROCESS FOR REMOVING IRON, CHROMIUM AND VANADIUM FROM PHOSPHORIC ACID

This invention relates to the purification of phosphoric acid by removing iron, chromium and/or vanadium therefrom, and more particularly to the purification of wet process phosphoric acid.

Phosphoric acid manufactured by burning phosphorus produced by the reduction of phosphate ore in an electric furnace (furnace acid) contains fewer impurities than phosphoric acid produced by the acidulation of phosphate rock (wet acid).

The wet process phosphoric acid usually contains impurities such as iron, chromium, vanadium, aluminum, sodium, calcium, magnesium, titanium, sulfuric acid, hydrofluoric acid and silica which are derived from the raw materials, phosphate rock and sulfuric acid. Recently, wet process phosphoric acid has been used not only for the preparation of fertilizer but also for industrial uses and food additive uses after separating the impurities.

Various processes for purifying the wet process phosphoric acid have been proposed, in particular, the solvent extraction process. In the solvent extraction process, phosphoric acid is extracted from the wet process phosphoric acid with organic solvents such as alcohols for example, n-butyl alcohol, isobutyl alcohol, isoamyl alcohol and cyclohexanol; ketones, for example, methyl ethyl ketone and methyl isobutyl ketone; ethers, for example, isopropyl ether and phosphoric acid esters, for example tributyl phosphate. The phosphoric acid is recovered from the solvent by stripping with an aqueous solution.

In these processes, the impurities from the wet process phosphoric acid are usually found primarily in the raffinate, but sufficient quantities of some of the contaminants are found in the product acid to make it unsatisfactory for some applications.

The removal of the impurities from the extracted acid is usually accomplished by washing the non-aqueous solution with an aqueous stream, usually in a countercurrent agitated column or a series of agitated vessels and settlers. The aqueous washing stream is usually recycled phosphoric acid product or purified water. The volume of scrubbing aqueous phase utilized is very important because phosphoric acid tends to be transferred to the aqueous phase from the solvent. This reduces the phosphoric acid concentration in the solvent which leads to a lower product acid concentration. More energy is then needed to concentrate the product acid. The aqueous scrubbing stream is recycled to the extractor, acidified with sulfuric acid and extracted. This reworking of the scrubber liquor dilutes the wet process phosphoric acid and reduces the amount of phosphoric acid that is recovered from the wet process phosphoric acid. A scrubber system that would remove the metal ion impurities without removing the phosphoric acid would clearly be desirable.

Impurities such as iron, chromium and vanadium are among those that can be substantially reduced by washing the solvent phase With water, phosphoric acid solution or an alkali metal phosphate solution. This results in the loss of phosphoric acid from the solvent which reduces the concentration of the acid that can be produced upon scrubbing with water and reduces the phosphoric acid recovery.

Attempts have been made to remove some contaminants by ion-exchange processes. The removal of metals from high strength aqueous phosphoric acid by ion exchange has not been very successful. The large hydrogen ion concentration competes with the metal cations for the basic sites on the ion exchange resin. Therefore, the ion exchange resin has a low capacity for the metal cations and the metal ion concentrations in the acid cannot be reduced significantly. British Patent No. 1,137,074 attempts to overcome this problem by carrying out the ion exchange on an organic solvent solution of phosphoric acid from extraction of wet process phosphoric acid. The phosphoric acid concentration in the solvent is only 5% to 15% and the acid is only partially dissociated in the organic solvent. Therefore, the cation capacity of the ion exchange resin is greatly increased over that in high strength aqueous solutions permitting the cation concentrations to be substantially reduced.

Similarly, Japanese Kokai 55-116,608 teaches that magnesium, calcium, aluminum, sodium and potassium can be reduced by contacting an alcoholic solution of phosphoric acid with a cation exchange resin.

Anion resins have been employed to remove chlorocomplexes of some metals from phosphoric acid solutions. U.S. Pat. No. 3,297,401 teaches iron and arsenic chlorocomplexes may be removed from aqueous phosphoric acid by adding hydrogen chloride and contacting with a weakly basic liquid ion exchange polymer. However, the residual chloride is corrosive and undesirable for industrial and food applications.

The present invention is a process for purifying phosphoric acid by removing a metal selected from the group consisting of iron, chromium and vanadium therefrom comprising the steps of,
(a) incorporating phosphoric acid into an organic solvent thereby forming a non-aqueous solution of phosphoric acid,
(b) contacting the non-aqueous solution with a strongly basic anion exchange polymer, and
(c) stripping the phosphoric acid from the non-aqueous solution into an aqueous solution.

Although any aqueous solution of phosphoric acid may be purified by the present invention, it is particularly desirable for purifying impure phosphoric acid produced by acidulation of phosphate rock or spent phosphoric acid employed for treating metals.

It is wholly unexpected for a strongly basic anion exchange polymer to be effective to remove metal cations such as iron, chromium and vanadium from a nonaqueous solution of phosphoric acid as all three of these metals are believed to be present in the phosphoric acid as cations. Even if the metals were present as anions it is well known that the acidic dissociation constant of phosphoric acid is 2.15, intermediate between vanadic acid, 3.87, and chromic acid, −0.98. Clearly one skilled in the art would not expect the process of the present invention to remove iron, chromium and vanadium preferentially from a solution containing phosphoric acid. As the metals removed by the present invention are believed to be present as cations, no explanation of the process of the present invention is presently known.

The ion exchange polymer is desirably present as a resin, although a liquid ion exchange polymer (a LIX) would be satisfactory if the polymer were compatible with the solvent and could be physically separated without excessive loss.

A strongly basic anion polymer or resin usually contains quaternary, preferably ammonium, ions fixed as active sites on the supporting polymer. In the basic form these quaternary ions appear as the hydroxide form. If the resin were employed in the basic form, it would rapidly be converted to the phosphate salt form. preferably, the anion resin would be employed in a neutral salt form of an acid such as sulfuric, phosphoric or the like. Most preferably, the anion resin is employed in the sulfate form if the specifications for the phosphate product permits. A suitable ion exchange resin is Amberlite 900 brand of resin manufactured by Rohm & Haas Co., preferably present in the salt form and by treatment with a 12% solution of sulfuric acid in the non-aqueous solvent.

After the ion exchange treatment the phosphoric acid is stripped from the nonaqueous solution into an aqueous solution by conventional means. The phosphoric acid may be recovered as an aqueous solution of phosphoric acid or as a salt of phosphoric acid.

The best mode of practicing the invention will be made clear to one skilled in the art from the following nonlimiting examples.

Comparative Examples A and B illustrate the prior art alternatives of a scrubbing stage employing water (A) or alternatively a cation tower (B) to remove the metals. All percentages indicated are by weight.

COMPARATIVE EXAMPLE A

Continuous pilot tests were run using a 6 mm (¼ in.) Kentics single stage static mixer and a 15×75 cm (6 in. ×2.5 ft.) decanter. The loaded solvent was fed with a two-stage centrifugal pump using a rotameter to control the flow. The aqueous scrubbing solution was fed using a pump and metered with a rotameter. The scrubbing solution in this run was water and the volume ratio of organics to acid (O/A) was 38.2. The system was maintained between 45° C. and 50° C. and the solution velocity through the static mixer was 90 cm/sec. (3 ft/sec.). The loaded solvent entering the static mixer contained 15.56% phosphoric acid and 43 ppm iron. The scrubbed solvent leaving the decanter contained 14.68% phosphoric acid and 22 ppm iron.

There was a 5.7% decrease in the phosphoric acid concentration in the loaded solvent due to the transfer of phosphoric acid from the solvent to the water scrubbing solution. This acid is usually recycled to the extraction column for recovery which represents a 5.7% decrease in the capacity of the extraction column. The weak phosphoric acid recycle to the extraction column dilutes the extractor feed which reduces the phosphoric acid concentration in the loaded solvent. The lower the acid concentration in the solvent entering the stripper, the lower the concentration of the aqueous acid product. This requires more energy to concentrate the phosphoric acid to a 75% or 85% product.

Each of the following ion exchange examples was operated continuously. Wet process phosphoric acid (85% by weight) was extracted into a solvent in a countercurrent, multistage, agitated column operated at 50° C. to 60° C.. The volume ratio of organic to aqueous phase (O/A) was about 4. The wet process phosphoric acid entered the top of the extraction column flowing down the column to contact the solvent which entered the bottom of the column. Agitators in the column intimately mixed the two phases to enable the extraction of the phosphoric acid into the solvent. The solvent normally used was a mixture containing 75% tributyl phosphate and 25% aliphatic hydrocarbon such as kerosene. The majority of the impurities were rejected and appeared in the aqueous raffinate stream.

The loaded solvent containing about 15% phosphoric acid exited the extraction column at the top and was pumped to the bottom of the ion exchange column.

COMPARATIVE EXAMPLE B

A 13 mm (½ in.) jacketed glass ion exchange column was set up in the laboratory. The 200 milliliters of Amberlite 200 (Rohm & Haas) cation exchange resin in the column was supported on a sintered glass plate at the bottom of the column. A pump was attached to the bottom of the column and the loaded solvent was pumped up through the resin bed. The bed was first treated with 3 bed volumes of a tributyl phosphate solution containing 12% sulfuric acid to put the resin in the acid form. The sulfuric acid solution was displaced with 3 bed volumes of tributyl phosphate.

Three liters of tributyl phosphate containing 16.4% phosphoric acid was pumped though the resin at a rate of 10 milliliters/minute. Each bed volume was collected separately and analyzed for phosphoric acid, iron, vanadium and chromium content. The results are summarized in Table I.

The ion exchange resin did not remove phosphoric acid from the loaded solvent as did the water scrubbing. The first bed volume was low in phosphoric acid content because of the dilution with tributyl phosphate in the column from the previous rinse. The strongly basic Amberlite 200 cation exchange resin removed over 80% of the vanadium but only about 60% of the chromium. It appears to have a fairly large capacity for these metal ions because they did not break through for the entire 15 bed volumes. However, the capacity of Amberlite 200 for iron in this solution is small as shown by the rapidly increasing iron content in the loaded solvent that is treated. The use of a strong cation exchange resin to remove metal cation impurities from the loaded solvent does not reduce the phosphoric acid concentration in the loaded solvent but it is not very effective at removing iron impurities. It is clear that the iron, chromium and vanadium removed were present as cations.

EXAMPLE 1

This run was carried out in the same way as Comparative Example B except the column was filled with 200 milliliters of an anion exchange resin (Amberlite 900) instead of the cationic resin. Three liters of loaded solvent were pumped through the column at a rate of 10 milliliters/minute. Each bed volume was collected separately and analyzed for phosphoric acid, iron, vanadium and chromium content. The results are summarized in Table II.

The resin was pretreated with about 10 bed volumes of 12% sulfuric acid in tributyl phosphate followed by 3 volumes of pure tributyl phosphate-kerosene solvent. The phosphoric acid loaded solvent was then pumped up through the bed. A 20% to 25% increase in bed volume occurred when the loaded solvent replaced the pure solvent in the bed. Therefore, the loaded solvent was pumped up through the resin bed to prevent packing of the resin bed and channeling of the loaded solvent through the bed.

Again the first 2 bed volumes were low in phosphoric acid content because of the dilution of the loaded solvent by the tributyl phosphate that remained in the column from the regeneration rinse. However, there was no significant reduction in the phosphoric acid content of the loaded solvent after passing through the ion exchange column.

Unexpectedly, the anion exchange resin removed more of the metal cations than did the cation exchange resin. It removed about 75% of the iron, vanadium and some chromium impurities. The removal dropped off some after 10 bed volumes but the decrease was not rapid. This indicates the process efficiently removes the metal cations without reducing the phosphoric acid concentration in the loaded solvent. This process would produce a higher concentration phosphoric acid product than the process that removes the metal ions by scrubbing with water as in Comparative Example A.

The ion exchange resin was regenerated with a 12% sulfuric acid solution in tributyl phosphate. This solution was completely miscible with the phosphoric acid loaded solvent and easily displaced it. An aqueous sulfuric acid solution was tried but the loaded solvent was held up in the resin and was not readily displaced. The aqueous sulfuric acid also held up in the resin when the regeneration step was finished and it was very difficult to wash it out. The sulfuric acid in the spent resin regeneration solution can be stripped from the tributyl phosphate with water in a small countercurrent stripping column or with an alkaline solution in a simple mixer-settler.

of phosphoric acid in said solvent, and stripping phosphoric acid from said solvent with an aqueous solution, the improvement comprising contacting said nonaqueous solution of phosphoric acid with a strongly basic anion exchange polymer thereby removing therefrom a metal selected from the group consisting of iron, chromium and vanadium.

2. The process of claim 1 wherein the organic solvent comprises a phosphate ester and an aliphatic hydrocarbon.

3. The process of claim 1 wherein the organic solvent comprises tributyl phosphate and kerosene.

4. The process of claim 1 wherein the anionic exchange polymer is a quaternary ammonium resin.

5. The process of claim 2 wherein the anionic exchange polymer is a quaternary ammonium resin.

6. The process of claim 3 wherein the anionic exchange polymer is a quaternary ammonium resin.

7. The process of claim 1 wherein the anionic ion exchange polymer is a neutral salt form of sulfuric acid.

8. The process of claim 2 wherein the anionic ion exchange polymer is a neutral salt form of sulfuric acid.

9. The process of claim 3 wherein the anionic ion exchange polymer is a neutral salt form of sulfuric acid.

10. The process of claim 4 wherein the anionic ion exchange polymer is a neutral salt form of sulfuric acid.

TABLE I

1ST EXHAUSTION CYCLE WITH AMBERLITE 200 AND LOADED TBP

| BED VOL. | % $H_3PO_4$ | PPM FE | PPM CR | PPM V | 85% $H_3PO_4$ PPM FE | PPM CR | PPM V | % REMOVAL FE | CR | V |
|---|---|---|---|---|---|---|---|---|---|---|
| 0 | 16.44 | 22 | 2.90 | 9.1 | 114 | 14.99 | 47.0 | 0 | 0 | 0 |
| 1 | 15.10 | 10 | 0.91 | 1.0 | 56 | 5.12 | 5.6 | 51 | 66 | 89 |
| 2 | 16.55 | 15 | 0.96 | 1.2 | 77 | 4.93 | 6.2 | 32 | 67 | 87 |
| 3 | 16.52 | 17 | 1.10 | 1.2 | 87 | 5.66 | 6.2 | 23 | 62 | 87 |
| 4 | 16.44 | 15 | 1.20 | 1.3 | 78 | 6.20 | 6.7 | 32 | 59 | 86 |
| 5 | 16.59 | 17 | 1.10 | 1.2 | 87 | 5.64 | 6.1 | 24 | 62 | 87 |
| 6 | 16.53 | 18 | 1.10 | 1.3 | 93 | 5.66 | 6.7 | 19 | 62 | 86 |
| 7 | 16.67 | 14 | 0.49 | 1.3 | 71 | 2.50 | 6.6 | 37 | 83 | 86 |
| 8 | 16.39 | 16 | 0.88 | 1.1 | 83 | 4.56 | 5.7 | 27 | 70 | 88 |
| 9 | 16.69 | 17 | 0.93 | 1.2 | 87 | 4.74 | 6.1 | 24 | 68 | 87 |
| 10 | 16.46 | 19 | 1.00 | 1.2 | 98 | 5.16 | 6.2 | 14 | 66 | 87 |
| 11 | 16.59 | 18 | 1.20 | 1.3 | 92 | 6.15 | 6.7 | 19 | 59 | 86 |
| 12 | 16.55 | 20 | 0.94 | 1.4 | 103 | 4.83 | 7.2 | 10 | 68 | 85 |
| 13 | 16.59 | 17 | 0.85 | 1.3 | 87 | 4.36 | 6.7 | 24 | 71 | 86 |
| 14 | 16.55 | 19 | 1.10 | 1.7 | 98 | 5.65 | 8.7 | 14 | 62 | 81 |
| 15 | 16.50 | 20 | 1.30 | 1.8 | 103 | 6.70 | 9.3 | 10 | 55 | 80 |

TABLE II

1ST EXHAUSTION CYCLE WITH AMBERLITE 900 AND LOADED TBP

| BED VOL. | % $H_3PO_4$ | PPM FE | PPM CR | PPM V | 85% $H_3PO_4$ PPM FE | PPM CR | PPM V | % REMOVAL FE | CR | V |
|---|---|---|---|---|---|---|---|---|---|---|
| 0 | 16.44 | 22.0 | 2.90 | 9.1 | 113.7 | 15.0 | 47.0 | 0 | 0 | 0 |
| 1 | 15.92 | 3.6 | 0.61 | 3.6 | 19.2 | 3.3 | 19.2 | 83 | 78 | 59 |
| 2 | 16.06 | 1.3 | 0.33 | 2.3 | 6.9 | 1.7 | 12.2 | 94 | 88 | 74 |
| 3 | 16.39 | 2.3 | 0.38 | 1.7 | 11.9 | 2.0 | 8.8 | 90 | 87 | 81 |
| 4 | 16.45 | 3.5 | 0.41 | 1.5 | 18.1 | 2.1 | 7.8 | 84 | 86 | 84 |
| 5 | 16.54 | 3.6 | 0.44 | 1.1 | 18.5 | 2.3 | 5.7 | 84 | 85 | 88 |
| 6 | 16.51 | 4.5 | 0.47 | 1.3 | 23.2 | 2.4 | 6.7 | 80 | 84 | 86 |
| 7 | 16.52 | 5.4 | 0.52 | 1.8 | 27.8 | 2.7 | 9.3 | 76 | 82 | 80 |
| 8 | 16.68 | 6.0 | 0.58 | 1.5 | 30.6 | 3.0 | 7.6 | 73 | 80 | 84 |
| 9 | 16.58 | 3.7 | 0.38 | 1.1 | 19.0 | 1.9 | 5.6 | 83 | 87 | 88 |
| 10 | 16.77 | 5.2 | 0.51 | 1.3 | 26.4 | 2.6 | 6.6 | 77 | 83 | 86 |
| 11 | 16.79 | 6.6 | 0.63 | 2.1 | 33.4 | 3.2 | 10.6 | 71 | 79 | 77 |
| 12 | 16.49 | 7.6 | 0.71 | 2.1 | 39.2 | 3.7 | 10.8 | 66 | 76 | 77 |
| 13 | 16.49 | 8.6 | 0.76 | 2.2 | 44.3 | 3.9 | 11.3 | 61 | 74 | 76 |
| 14 | 16.43 | 9.5 | 0.79 | 2.9 | 49.1 | 4.1 | 15.0 | 57 | 73 | 68 |
| 15 | 16.49 | 9.3 | 0.90 | 2.4 | 47.9 | 4.6 | 12.4 | 58 | 69 | 74 |

We claim:

1. In a process for purifying phosphoric acid by the process comprising extracting an impure aqueous solution of phosphoric acid with an organic solvent, thereby forming an aqueous raffinate, and a nonaqueous solution 11. The process of claim 5 wherein the anionic ion exchange polymer is a neutral salt form of sulfuric acid.

12. The process of claim 6 wherein the anionic ion exchange polymer is a neutral salt form of sulfuric acid.

* * * * *